United States Patent Office.

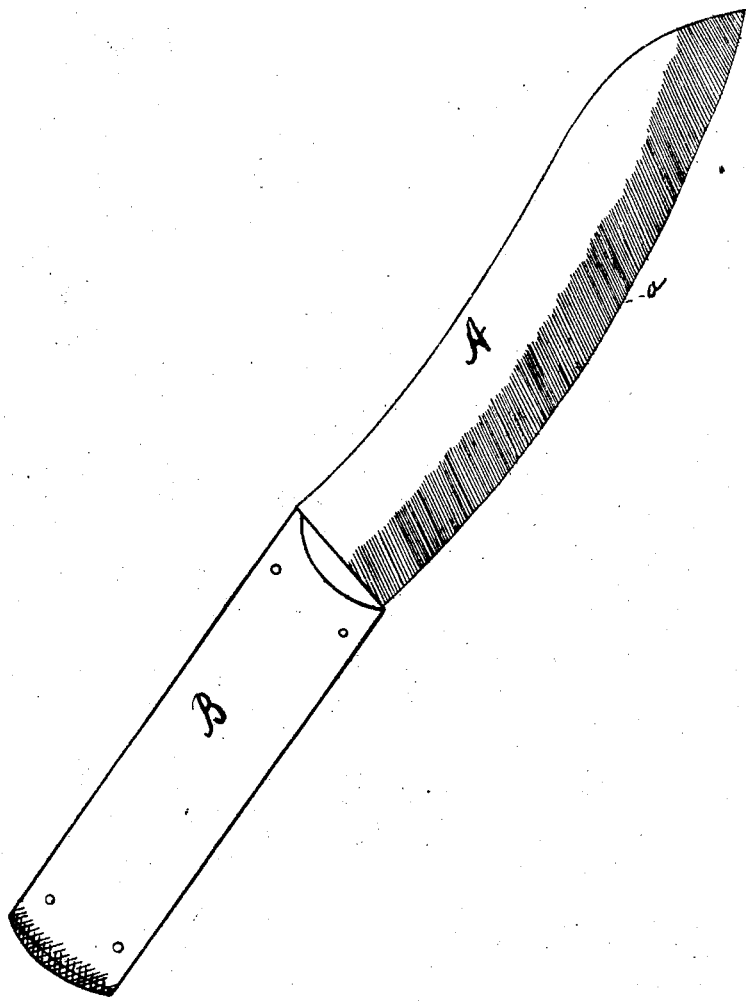

FREDERICK COULON, OF ROCKFORD, ILLINOIS.

Letters Patent No. 76,055, dated March 31, 1868.

KNIFE FOR CUTTING STRAW BANDS.

The Schedule referred to in these Letters Patent and making part of the same.

TO ALL WHOM IT MAY CONCERN:

Be it known that I, FREDERICK COULON, of Rockford, in the county of Winnebago, and State of Illinois, have invented a new and improved Knife for Cutting Straw Bands; and I do hereby declare that the following is a full and exact description of the same, reference being had to the accompanying drawings and to the letters of reference marked thereon.

This invention consists of an improved knife, with curved blade and sickle-edge, for the purpose of cutting straw bands, as hereinafter described.

In the drawings, A represents a curved knife-blade, provided with the sickle-edge $a$, the teeth forming which are so arranged as to incline slightly in the direction of the handle, the object of which is that the operation of cutting may be performed by drawing the knife toward the person. B represents a handle attached in any suitable manner.

This invention is intended to be used in connection with threshing-machines, where it is essential that the bundles of grain shall be loosened and delivered to the machine with great rapidity, in order to keep up the supply. Untying them, or cutting them with any ordinary instrument, is a slow operation, involving much labor, the greater part of which is saved by my invention, for by simply drawing the knife across the band it is severed instantly, and the bundle is ready for the machine.

Having thus described my invention, what I claim as new, and desire to secure by Letters Patent, is—

A knife having the handle B and blade A, the latter being provided with an incline sickle-edge, $a$, curved outwardly, or in a convex line, from the handle to the point of the blade, substantially as and for the purpose specified.

FREDERICK COULON.

Witnesses:
GEORGE S. RICE,
H. G. CLARK.